Sept. 11, 1923.

E. C. OLIVER

TWIST DRILL

Filed July 11, 1921

1,467,491

INVENTOR.
Edd C. Oliver.
BY
Charles E. Wisely
ATTORNEY.

Patented Sept. 11, 1923.

1,467,491

UNITED STATES PATENT OFFICE.

EDD C. OLIVER, OF ADRIAN, MICHIGAN.

TWIST DRILL.

Application filed July 11, 1921. Serial No. 483,870.

*To all whom it may concern:*

Be it known that I, EDD C. OLIVER, a citizen of the United States, residing at Adrian, county of Lenawee, State of Michigan, have invented a certain new and useful Improvement in Twist Drills, and declare the following to be a full, clear, and exact description of the same, such as will enable others skilled in the art to which it pertains to make and use the same, reference being had to the accompanying drawings, which form a part of this specification.

This invention relates to twist drills, and the object of the invention is to provide a drill of such form at the cutting end as to secure a materially higher efficiency in operation particularly by reason of the speed with which the drill may be forced into the work without overheating and of such form that he wear is materially reduced. In previously known twist drills in which the point is ground on the face of a grinding wheel, the elements of the face are necessarily straight lines and the clearance given the drill at the center is less than the periphery. Therefore, such previous drill, taking a feed which is limited by the outside clearance, will rub at the center. This generates heat and naturally destroys the drill. In my improved form of drill point the grinding wheel is moved into the face in the direction of the feed of the drill as the drill is revolved and grinds a clearance which is practically of equal extent clear to the point, but the point itself is not ground away and this produces a hollow in front of the cutting edge of the chisel point increasing in depth from the rear of the cutting edge which permits action at the point and allows the drill to penetrate with much less pressure than with previously known points. All these several results are produced by the form of the cutting end of the drill which in other respects, as hereinafter more fully described, may be of the same general form and character as the standard twist drill. These objects and various novel features of construction of a device embodying my invention are hereinafter more fully described and claimed, and a twist drill of the two lipped form embodying my invention is shown in the accompanying drawings in which—

Figure 1:
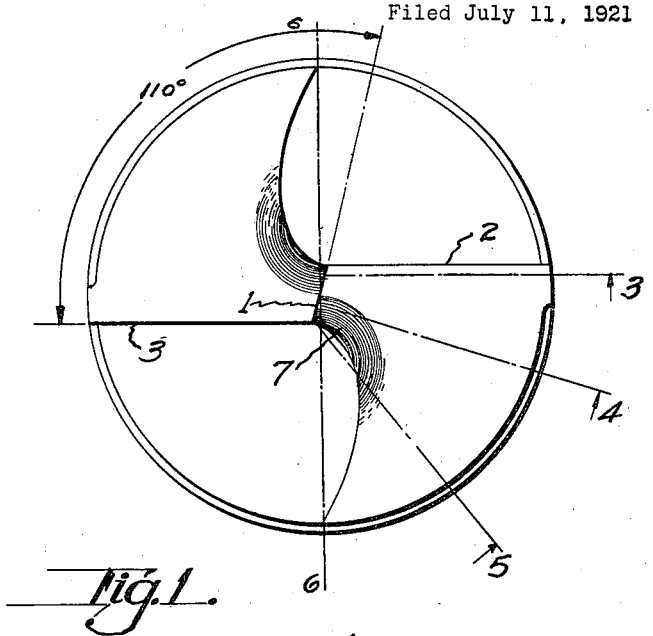
Fig. 1 is an end view of the drill illustrating my improved form of cutting end.
Figure 2:
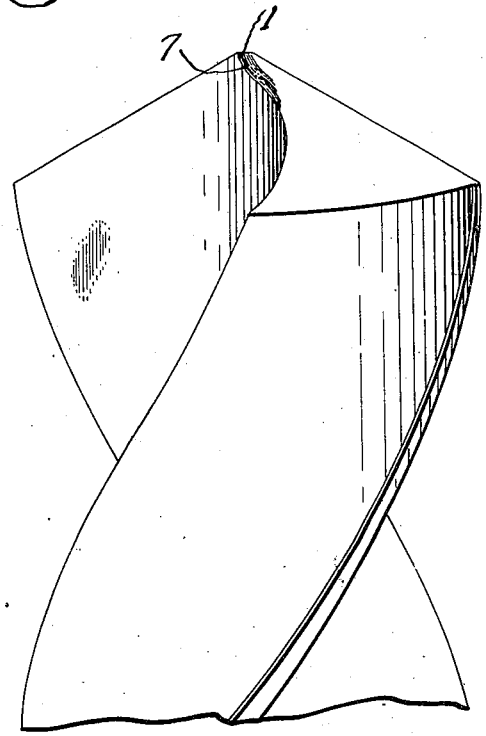
Fig. 2 is a side view thereof.
Figure 3:
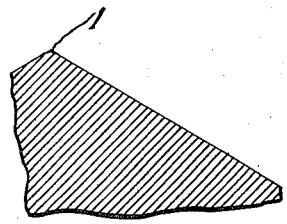
Fig. 3 is a section through one of the lands of the drill from the periphery to the point or web of intersection taken along the line 3 of Fig. 1.
Figure 4:
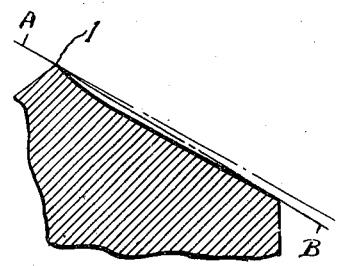
Fig. 4 is a similar section taken on line 4 of Fig. 1.
Figure 5:
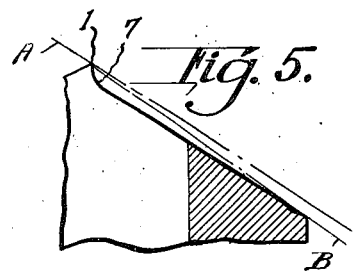
Fig. 5 is a similar section taken on line 5 of Fig. 1.

The drill illustrated is of the two lipped type and, according to my invention, may have any preferred angle of the cutting lip. While the angle as well as the length of the cutting lips must be exactly the same, I have increased the length of the cutting edge over that of a drill of the usual form by decreasing the angle of web intersection in relation to the cutting edge to about 100 degrees rather than 120 to 130 degrees as in the usual types. This is shown clearly in Fig. 1, the web intersection being shown at 1 and one cutting edge at 2 with the other cutting edge at 3. It will be seen from Fig. 1 that the inner ends of the cutting lip approach very closely to a diametrical line of the drill indicated at 6. In the usual drill in which the angle of the web intersection in relation to the cutting edge is about 130 degrees, the cutting lip is materially shorter than in the form here shown. In such previous construction penetration of the drill is retarded due to the considerable area at the center, approximately equal in diameter to the length of the point 1, which in the previous construction is practically ground up or pulverized rather than cut. Such undesired result is practically eliminated in the construction here shown through reduction of the angle of the web intersection relative to the cutting edge. Further, to secure the desired increase in cutting speed, I have formed the lands adjacent the point and at the rear of the cutting edge of each land with a depression 7 which is graphically shown by shade lines in Fig. 1 providing a clearance for material removed by the point itself which material, by reason of this particular depression, can pass from beneath the land to the space between the lands at the rear. The end surface of each land is also peculiar in form as will be understood from Figs. 3, 4 and 5. The cutting edge is straight as with the usual drill and lies at some predetermined angle to the longitudinal axis usually about 59 degrees which, however, may be varied as may be desired. From the cutting edge toward the rear, and the land is not only cut back at an angle as usual, as will be understood from Fig. 2, providing what is known as the clearance angle, but from just back of the cutting edge, as shown in Fig. 4, the end of the land is hollowed and this hollow or concave form increases, as will be understood from Figs. 4 and 5, toward the rear of the land and is particularly sharp at the point 7 just forward of the point of web intersection as will be understood in Fig. 5. The formation of this comparatively sharply depressed portion 7 just forward of the point on each land extends nearly to the axis of the tool and increases in depth from the point of beginning to the rear of the respective land. This depression to a material extent makes a cutting edge of the point which cuts and removes the material at the center and does not crush or pulverize it as is the case with the standard type of twist drill.

As previously stated, the drill point is formed by a grinding wheel which feeds into the face of the drill parallel to its axis and at the same time the drill is revolved. The surface of each land thus forms an oblique helicoid except that the point is not ground away. The surface of the land therefore on any radial line to near the point is parallel with the imaginary coned surface formed by rotation of the cutting edge and, while I have used the word concave in referring to this surface, it is only concave with reference to the line B of Figs. 4 and 5, the major portion of the surface being a straight line and parallel to the cutting edge represented by the line A of Figs. 4 and 5. The term "oblique helicoid" refers to this straight portion of the surface of the land. The increasing depth of the concavity at the point may be produced by means of a grinding wheel which moves across the end of the drill and which at the same time it is moved is fed into the face of the drill, the drill being turned during the grinding as is described in my co-pending application Serial No. 484,027, filed July 12, 1921, for an automatic grinder for twist drills.

I have found that this form of the cutting end as here represented and described produces a drill that has an efficiency of at least fifty per cent greater in speed of drilling than is secured in the usual type due to the fact that the drill does not heat so readily, penetrates the work more easily and therefore can be operated at a higher speed without increasing the wear or waste of the drill. To secure this desired shape a special form of grinding device should be used although the form may be provided by hand grinding. The hand ground drill, however, is not usually perfect in form. The form here shown and described has been developed through a long series of experiments and the statements as to increased efficiency due to the form of the cutting end herein made have been determined from actual use of the drill in ordinary production work in contrast with the usual form of twist drills on the same work.

Having thus briefly described my invention, what I claim and desire to secure by Letters Patent of the United States is—

1. A twist drill having the face of each land formed at the desired clearance angle and being concave in form to an increasing extent from near the cutting edge to the rear of the land and with an increased depth of depression just forward of the point at the rear of each land, whereby the point forms a cutter.

2. A twist drill having the face of each land substantially of the form of an oblique helicoid, all radial lines at the surface being practically parallel with the cutting edge to near the point of the web intersection and extending to the point on a curve of decreasing radius for successive lines from back of the cutting edge providing a clearance immediately forward of and permitting a cutting action by the point.

3. A twist drill having the face of each land formed at the desired clearance angle and provided with a depression forward of and having a curved wall extending to the point of the web intersection, said depression being of increasing depth from about the center of the point to the rear of the land, and the face of the land being tangent to the curve of the depression on any radial line at the surface.

4. A twist drill having the face of each land substantially of the form of an oblique helicoid, all radial lines at the surface being practically parallel with the corresponding element of the cone formed by the rotation of the cutting edge of the lip to near the line forming the chisel point and extending to this line on a curve, providing a clearance immediately forward of and permitting a cutting action by the chisel point.

In testimony whereof, I sign this specification.

EDD C. OLIVER.